(12) United States Patent
Jeol et al.

(10) Patent No.: US 12,247,099 B2
(45) Date of Patent: Mar. 11, 2025

(54) PROCESS FOR PREPARING PARTICLES OF POLYPHENYLENE SULFIDE POLYMER

(71) Applicant: SOLVAY SPECIALTY POLYMERS USA, LLC, Alpharetta, GA (US)

(72) Inventors: Stéphane Jeol, Saint-Genis-Laval (FR); Kelly D. Branham, Woodstock, GA (US); David Blake Roller, Dunwoody, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 0 days.

(21) Appl. No.: 18/404,978

(22) Filed: Jan. 5, 2024

(65) Prior Publication Data
US 2024/0182635 A1      Jun. 6, 2024

Related U.S. Application Data

(62) Division of application No. 16/619,389, filed as application No. PCT/EP2018/062425 on May 14, 2018, now Pat. No. 11,905,364.

(60) Provisional application No. 62/516,387, filed on Jun. 7, 2017.

(30) Foreign Application Priority Data

Aug. 3, 2017   (EP) ...................... 1718614

(51) Int. Cl.
| | |
|---|---|
| *C08G 63/688* | (2006.01) |
| *B29B 9/10* | (2006.01) |
| *B29C 64/153* | (2017.01) |
| *B33Y 70/00* | (2020.01) |
| *C08G 63/16* | (2006.01) |
| *B29K 71/00* | (2006.01) |

(52) U.S. Cl.
CPC ............ *C08G 63/6886* (2013.01); *B29B 9/10* (2013.01); *B29C 64/153* (2017.08); *C08G 63/16* (2013.01); *B29K 2071/00* (2013.01); *B33Y 70/00* (2014.12)

(58) Field of Classification Search
None
See application file for complete search history.

(56) References Cited

U.S. PATENT DOCUMENTS 5,295,985 A  *  3/1994  Romesser ................. C08L 3/02
                                                        525/437

FOREIGN PATENT DOCUMENTS

| CN | 1042231626 A | * | 12/2014 |
| JP | 110273594 | * | 10/1998 |
| JP | 2014043522 A2 | * | 3/2014 |

* cited by examiner

*Primary Examiner* — Tae H Yoon
(74) *Attorney, Agent, or Firm* — Osha Bergman Watanabe & Burton LLP

(57) ABSTRACT

The invention relates to a process for preparing particles of polyphenylene sulfide polymer (PPS), based on the use of a polyester polymer (PE) comprising units from a dicarboxylic acid component and a diol component, wherein at least 2 mol. % of the diol component is a poly(alkylene glycol). The process comprises the melt-blending of the PPS with the PE, the cooling the blend and the recovery of the particles by dissolution of the PE into water. The present invention relates to PPS particles obtained therefrom and to the use of these particles in SLS 3D printing, coatings and toughening of thermoset resins.

5 Claims, 1 Drawing Sheet

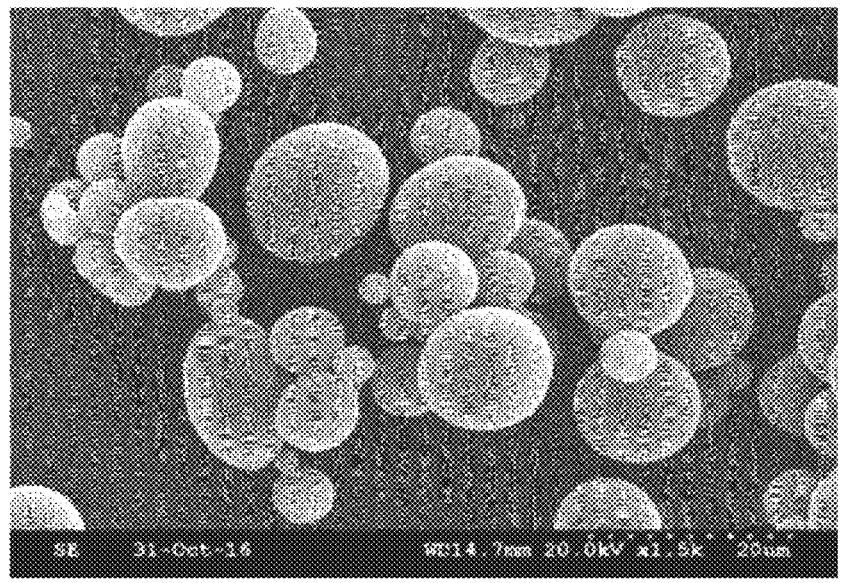

PROCESS FOR PREPARING PARTICLES OF POLYPHENYLENE SULFIDE POLYMER

RELATED APPLICATIONS

This application is a divisional of U.S. application Ser. No. 16/619,389 filed on Dec. 4, 2019 (granted as U.S. Pat. No. 11,905,364), which claims priority to U.S. provisional application No. 62/516,387 filed on Jun. 7, 2017 and to European application No. 17184614.0 filed Aug. 3, 2017, the whole content of each of these applications being incorporated herein by reference for all purposes

TECHNICAL FIELD

The present invention relates to a process for preparing particles of polyphenylene sulfide polymer (PPS), based on the use of a polyester polymer (PE) comprising units from a dicarboxylic acid component and a diol component, wherein at least 2 mol. % of the diol component is a poly(alkylene glycol). The process comprises the melt-blending of the PPS with the PE, the cooling the blend and the recovery of the particles by dissolution of the PE into water. The present invention also relates to PPS particles obtained therefrom and to the use of these particles in SLS 3D printing, coatings and toughening of thermoset resins.

BACKGROUND

Additive manufacturing systems are used to print or otherwise build 3D objects from a digital blueprint created with computer-aided design (CAD) modelling software. Selective laser sintering ("SLS"), one of the available additive manufacturing techniques, uses electromagnetic radiation from a laser to fuse powdered materials into a mass. The laser selectively fuses the powdered material by scanning cross-sections generated from the digital blueprint of the object on the surface of a powder bed. After a cross-section is scanned, the powder bed is lowered by one layer thickness, a new layer of material is applied, and the bed is rescanned. Locally full coalescence of polymer particles in the top powder layer is necessary as well as an adhesion with previous sintered layers. This process is repeated until the object is completed.

The article of Schmid et. al. (J. Mater. Res, Vol 29, No. 17, 2014) reviews the properties of polymers and their powdered forms for SLS 3D Printing. The particles should be spherical to induce a free-flowing behaviour and be distributed on the powder bed of the printer by roller or blade systems. Spherical particles with a particle size distribution between 20 and 80 μm are generally optimal for operation on SLS equipment.

Spherical polymer powders can be prepared by a process called prilling, according to which the polymer is dissolved in an organic solvent, followed by precipitation into a large volume of non-solvent. First, the use of solvents generates substantial environmental and disposal problems. Second, this process requires that the polymer be soluble into the organic solvent at a sufficient level for efficient processing. While polyphenylene sulfide (PPS) presents valuable thermal properties, mechanical properties and chemical resistance, which make it interesting for SLS 3D printing notably, PPS is insoluble in most common solvents.

U.S. Pat. No. 8,454,866 B2 discloses preparation of powders of aliphatic polyamides by forming a melt blend with an additive which is a block copolymer comprising poly(alkylene oxide) blocks. These blends are disintegrated in water, to produce a dispersion of polyamide particles that can then be isolated by filtration and drying. The poly (alkylene oxide) polymers described in this patent while useful for preparing aliphatic polyamide powders, lack the thermal stability to be used with the high performance aromatic polymers.

JP2014043522 describes the use of modified PET melt-blended with PPS in order to prepare PPS particles. However, the modified PET does not dissolve in water heated up to 95° C.

One of the objects of the present invention is to provide a process for preparing spherical particles of PPS without using organic solvents.

Another object of the invention is to provide particles of PPS well-suited for the SLS 3D printing, coating compositions and toughening of thermoset resins.

BRIEF DESCRIPTION OF THE FIGURE

FIG. 1 is a scanning electron microscopy (SEM) image of the PPS particles of Example 1.

DISCLOSURE OF THE INVENTION

A first object of the present invention is a process for preparing spherical particles of PPS without using organic solvents. The merit of the Applicant has been to identify a class of materials, hereby called polyester polymer (PE), having a thermal stability sufficient to be melt-blend with PPS, which makes possible the preparation of spherical particles of PPS that are suitable for co-processing with high temperature aromatic PPS polymer. The PE polymer of the present invention withstands high temperatures, that-is-to-say notably does not degrade at high temperatures, for example above 250° C. Additionally, the polyester polymer (PE) is such that it can be dissolved in water, possibly heated to a temperature up to 95° C., without the need to supplement the water with a base or an acid. The PE polymer of the invention therefore not only presents a thermal stability sufficient to be melt-blended with PPS, but also present a solubility or dispersibility in water, which makes the over process for preparing PPS particles easy to implement.

The process of the present invention is based on the melt-blending of PPS with a water-soluble or water dispersible polyester (PE), in such a way as to create particles of PPS dispersed in a phase made of the water-soluble or water-dispersible polyester (PE), for example by applying a mixing energy sufficient to create discrete particles. The blend is then cooled down and the particles are recovered by dissolution of the polyester in water, possibly heated to a temperature up to 95° C.

In the present application:
  any description, even though described in relation to a specific embodiment, is applicable to and interchangeable with other embodiments of the present disclosure;
  where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components; any element or component recited in a list of elements or components may be omitted from such list; and any recitation herein of numerical ranges by endpoints includes all numbers subsumed within the recited ranges as well as the endpoints of the range and equivalents.

More precisely, the present invention relates to a process for preparing particles of polyphenylene sulfide polymer (PPS), comprising the following steps:
melt-blending a mixture (M) comprising:
a) at least one PPS, and
b) at least one polyester polymer (PE) comprising units from:
at least one dicarboxylic acid component,
at least one diol component, wherein at least 2 mol. % of the diol component is
a poly(alkylene glycol) having a formula (I):

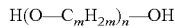

H(O—$C_mH_{2m}$)$_n$—OH wherein m is an integer from 2 to 4 and n varies from 2 to 10,
processing the mixture (M) into pellets or strands,
optionally cooling the pellets or strands at a temperature below 80° C.,
contacting said pellets or strands with water, for example by immersion of the pellets or strands into water, the water being possibly heated to a temperature up to 95° C.,
recovering the particles, for example isolating the particles from water,
optionally drying the particles, and
optionally sieving the particles.

More generally, the step consisting in melt-blending the mixture (M) can take place with any suitable device, such as endless screw mixers or stirrer mixers, for example compounder, compatible with the temperature needed to melt the aromatic PPS polymer. The amount of energy applied to this step may be adjusted so as to control the size of the polymeric particles obtained therefrom. The skilled person in the art can adjust the equipment (e.g. screw geometry) and the parameters of the equipment (e.g. rotation speed) to obtain particles of the desired size, for example with an average diameter varying between about 0.5 μm and about 500 μm.

According to a preferred embodiment, the step of melt-blending takes place at a temperature above 280° C., for example above 290° C., for example above 300° C., above 310° C.

The step consisting in processing the mixture into pellets or strands can be carried out by a process of extrusion through a die.

The steps of melt-blending and processing into pellets or strands preferably tale place in an extruder equipped with an extrusion die.

The step of cooling is conducted by any appropriate means, at a temperature lower than 80° C., for example lower than 50° C. Mention can notably be made of air cooling or quenching in a liquid, for example in water.

The stage of contacting the pellets or strands with water may consist in a step of immersing the same into water, possibly multiple bath of water, for example heated to a temperature up to 95° C. This step allows dissolution of the polyester so as to recover the PPS particles. The inventors have demonstrated that the water does not need to be supplemented with an acid or a base to adequately dissolve the polyester. The present invention advantageously makes use of neutral pH water or running water.

The steps of the process of the present invention can be carried out batch-wise or continuously.

According to an embodiment, the steps of cooling the pellets or strands at a temperature below 80° C., for example below 50° C., and contacting said pellets or strands with water, for example by immersion of the pellets or strands into water, the water being possibly heated to a temperature up to 95° C., can be carried out simultaneously in the same equipment.

The process of the invention may also comprise an additional step of drying of the particles, and/or an additional step of sieving the particles. The step of drying can for example take place in a fluidized bed.

Polyphenylene Sulfide Polymer (PPS)

According to the present invention, a "polyphenylene sulfide polymer (PPS)" denotes any polymer of which at least about 50 mol. % of the recurring units are recurring units ($R_{PPS}$) of formula (L):

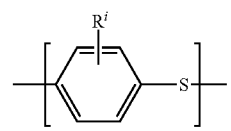

wherein:
each R is independently selected from the group consisting of hydrogen atoms, halogen atoms, $C_1$-$C_{12}$ alkyl groups, $C_7$-$C_{24}$ alkylaryl groups, $C_7$-$C_{24}$ aralkyl groups, $C_6$-$C_{24}$ arylene groups, $C_1$-$C_{12}$ alkoxy groups, and $C_6$-$C_{18}$ aryloxy groups, and
i is an integer from 0 to 4.

In its broadest definition, the polyphenylene sulfide polymer (PPS) of the present invention can be made of substituted and/or unsubstituted phenylene sulfide groups.

According to an embodiment of the present invention, the polyphenylene sulfide polymer (PPS) denotes any polymer of which at least 50 mol. % of the recurring units are recurring units ($R_{PPS}$) of formula (L') wherein $R_1$ is an hydrogen atom:

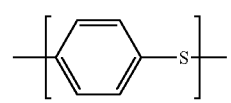

According to an embodiment of the present invention, the polyphenylene sulfide polymer is such that at least about 60 mol. %, at least about 70 mol. %, at least about 80 mol. %, at least about 90 mol. %, at least about 95 mol. %, at least about 99 mol. % of the recurring units in the PPS are recurring units ($R_{PPS}$) of formula (L) or (L')

The mol. % are hereby based are based on the total number of moles in the PPS.

According to an embodiment of the present invention, the PPS polymer is such that about 100 mol. % of the recurring units are recurring units ($R_{PPS}$) of formula (L) or (L'). According to this embodiment, the PPS polymer consists essentially of recurring units ($R_{PPS}$) of formula (L) or (L').

PPS is notably manufactured and sold under the trade name Ryton® PPS by Solvay Specialty Polymers USA, LLC.

According to the present invention, the melt flow rate (at 316° C. under a weight of 5 kg according to ASTM D1238, procedure B) of the PPS may be from 50 to 400 g/10 min, for example from 60 to 300 g/10 min or from 70 to 200 g/10 min.

According to an embodiment, the PPS polymer is present in the mixture (M) is an amount of less than 60 wt. %, less than 55 wt. %, less than 50 wt. %, less than 45 wt. %, less than 40 wt. %, less than 35 wt. %, less than 30 wt. %, less than 25 wt. % or less than 20 wt. %, based on the total weight of the mixture (M).

Polyester Polymer (PE)

According to the present invention, a "polyester polymer (PE)" denotes any polymer comprising units from:
- at least one dicarboxylic acid component,
- at least one diol component, wherein at least 2 mol. % of the diol component is a poly(alkylene glycol) of formula (I):

wherein m is an integer from 2 to 4 and n varies from 2 to 10.

According to an embodiment, the dicarboxylic acid component comprises at least one aromatic dicarboxylic acid, for example selected from the group consisting of isophthalic acid(IPA), terephthalic acid (TPA), naphthalendicarboxylic acids (e.g. naphthalene-2,6-dicarboxylic acid), 4,4'-bibenzoic acid, 2,5-pyridinedicarboxylic acid, 2,4-pyridinedicarboxylic acid, 3,5-pyridinedicarboxylic acid, 2,2-bis(4-carboxyphenyl)propane, bis(4-carboxyphenyl)methane, 2,2-bis(4-carboxyphenyl)hexafluoropropane, 2,2-bis(4-carboxyphenyl)ketone, 4,4'-bis(4-carboxyphenyl)sulfone, 2,2-bis(3-carboxyphenyl)propane, bis(3-carboxyphenyl)methane, 2,2-bis(3-carboxyphenyl)hexafluoropropane, 2,2-bis(3-carboxyphenyl)ketone, bis(3-carboxyphenoxy)benzene, and mixtures thereof.

According to an embodiment, the diol component is such that at least 2 mol. % of the diol component is a poly(ethylene glycol) of formula (II):

$$H(O-CH_2-CH_2)_n-OH$$

wherein n varies from 2 to 10.

According to an embodiment, the diol component is such that at least 4 mol. %, at least 10 mol. %, at least 20 mol. %, at least 30 mol. %, at least 40 mol. % or at least 50 mol. % of the diol component (based on the total number of moles of the diol component) is a poly(alkylene glycol) of formula (I):

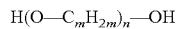

wherein m is an integer from 2 to 4 and n varies from 2 to 10, preferably a poly(ethylene glycol) of formula (II):

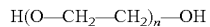

wherein n varies from 2 to 10.

According to another embodiment, the diol component is such that at least 2 mol. %, at least 4 mol. %, at least 10 mol. %, at least 20 mol. %, at least 30 mol. %, at least 40 mol. % or at least 50 mol. % of the diol component (based on the total number of moles of the diol component), is a diethylene glycol of formula HO—CH$_2$—CH$_2$—O—CH$_2$—CH$_2$—OH.

According to a further embodiment, apart from the 2 mol. % minimal content of poly(alkylene glycol), the diol component may comprise at least one diol selected from the group consisting of ethylene glycol, 1,4-cyclohexanedimethanol, propane-1,2-diol, 2,2-dimethyl-1,3-propanediol, 1,3-propanediol, 1,4-butanediol, 1,5-pentanediol, 1,6-hexanediol, 2-methyl-1,5-pentanediol, isosorbide and 2,5-bishydroxymethyltetrahydrofuran.

According to yet another embodiment, the diol component of the polyester polymer (PE) consists essentially in:
- a diol selected from the group consisting of ethylene glycol, 1,4-cyclohexanedimethanol, propane-1,2-diol, 2,2-dimethyl-1,3-propanediol, 1,3-propanediol, 1,4-butanediol, 1,5-pentanediol, 1,6-hexanediol, 2-methyl-1,5-pentanediol, isosorbide and 2,5-bishydroxymethyltetrahydrofuran,
- at least 2 mol. % of poly(ethylene glycol) having a formula (I):

wherein n varies from 2 to 10.

According to another embodiment, the diol component of the polyester polymer (PE) consists essentially in:
- a diol selected from the group consisting of ethylene glycol, 1,4-cyclohexanedimethanol, propane-1,2-diol, 2,2-dimethyl-1,3-propanediol, 1,3-propanediol, 1,4-butanediol, 1,5-pentanediol, 1,6-hexanediol, 2-methyl-1,5-pentanediol, isosorbide and 2,5-bishydroxymethyltetrahydrofuran,
- at least 2 mol. % of diethylene glycol (based on the total number of diol components).

According to the present invention, preferred polyester (PE) are polyesters which further comprise recurring units from a difunctional monomer containing at least one SO$_3$M group attached to an aromatic nucleus, wherein the functional groups are carboxy and wherein M is H or a metal ion selected from the group consisting of sodium, potassium, calcium, lithium, magnesium, silver, aluminium, zinc, nickel, copper, palladium, iron, and cesium, preferably from the group consisting of sodium, lithium and potassium. Such preferred polyester are sometimes called sulfopolyester (SPE). According to this embodiment, the difunctional sulfomonomer can for example be present in the SPE in a molar ratio comprised between 1 to 40 mol. %, based on the total number of moles (i.e. total number of moles of diacid and diol components if the SPE is composed exclusively of diacid and diol components) in the SPE, for example between 5 and 35 mol. %, or between 8 to 30 mol. %.

According to an embodiment of the present invention, the polyester (PE) comprises units from:
- at least one dicarboxylic acid component,
- at least one diol component, wherein at least 2 mol. % of the diol component is a poly(alkylene glycol) of formula (I):

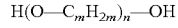

wherein m is an integer from 2 to 4 and n varies from 2 to 10,
- at least one difunctional monomer containing at least one SO$_3$M group attached to an aromatic nucleus, wherein the functional groups are carboxy and wherein M is H or a metal ion selected from the group consisting of sodium, lithium and potassium According to another embodiment of the present invention, the polyester (PE) comprises units from:
- at least one aromatic dicarboxylic acid component,
- at least one diol component,
- at least 1 mol. % (based on the total number of units moles in the PE, e.g. total number of diacid and diol components if the PE is composed exclusively of diacid and diol units) of poly(alkylene glycol) of formula (I):

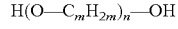

wherein m is an integer from 2 to 4 and n varies from 2 to 10, preferably m equals 2 and n equals 2,
  at least one aromatic dicarboxylic acid containing at least one $SO_3M$ group attached to an aromatic nucleus, wherein M is H or a metal ion selected from the group consisting of sodium, lithium and potassium.

According to a preferred embodiment of the present invention, the polyester (PE) comprises or consists essentially in units from:
  an aromatic dicarboxylic acid selected from the group consisting of isophthlaic acid(IPA), terephthalic acid (TPA), naphthalendicarboxylic acids (e.g. naphthalene-2,6-dicarboxylic acid), 4,4'-bibenzoic acid, 2,5-pyridinedicarboxylic acid, 2,4-pyridinedicarboxylic acid, 3,5-pyridinedicarboxylic acid, 2,2-bis(4-carboxyphenyl)propane, bis(4-carboxyphenyl)methane, 2,2-bis(4-carboxyphenyl)hexafluoropropane, 2,2-bis(4-carboxyphenyl)ketone, 4,4'-bis(4-carboxyphenyl)sulfone, 2,2-bis(3-carboxyphenyl)propane, bis(3-carboxyphenyl)methane, 2,2-bis(3-carboxyphenyl)hexafluoropropane, 2,2-bis(3-carboxyphenyl)ketone, bis(3-carboxyphenoxy)benzene and mixture thereof, preferably isophthalic acid,
  a diol selected from the group consisting of ethylene glycol, 1,4-cyclohexanedimethanol, propane-1,2-diol, 2,2-dimethyl-1,3-propanediol and mixture thereof,
  at least 1 mol. % (based on the total number of units moles in the PE, e.g. total number of diacid and diol components if the PE is composed exclusively of diacid and diol units) of diethylene glycol,
  an aromatic dicarboxylic acid (e.g. isophthalic acid, terephthalic acid, 2,6-naphthalene dicarboxylic acid) containing at least one $SO_3M$ group attached to an aromatic nucleus, wherein M is H or a metal ion selected from the group consisting of sodium, lithium and potassium According to an embodiment, the PE comprises at least 2 mol. %, at least 4 mol. %, at least 10 mol. %, at least 20 mol. %, at least 30 mol. %, at least 40 mol. % or at least 50 mol. % of diethylene glycol, based on the total number of units moles in the PE, e.g. total number of diacid and diol components if the PE is composed exclusively of diacid and diol units.

Illustrative of such polyesters are Eastman AQ Polymers, especially those having a glass transition temperature ranging from about 25° C. to about 50° C. Most preferred is Eastman AQ 38S which is a polyester composed of diethylene glycol, cyclohexanedimethanol (CHDM), isophthalates and sulfoisophthalates units.

The polyester (PE) of the present invention may be in the form of a salt of sulfonic acid or/and carboxylic acid, more precisely a sulfonate —$SO_3^-$ or a carboxylate —$COO^-$. The PE may therefore comprise one or several groups ($SO_3^-$ $M^+$) and/or ($COO^-$ $M^+$), in which M is a metal. According to an embodiment, M is selected from the group consisting of sodium, potassium or lithium, calcium, magnesium, silver, aluminium, zinc, nickel, copper, palladium, iron and cesium.

The polyesters (PE) of the present invention can for example be derived through esterification of the mentioned components.

The number average molecular weight of the polyesters (PE) may be between 1,000 g/mol and 40,000 g/mol, more preferentially between 2,000 g/mol and 30,000 g/mol, as determined by GPC.

According to an embodiment, the PE polymer is present in the mixture (M) in an amount of at least 30 wt. %, at least 35 wt. %, at least 40 wt. %, at least 45 wt. %, at least 45 wt. %, at least 50 wt. %, at least 55 wt. %, at least 60 wt. %, at least 65 wt. %, at least 70 wt. %, at least 75 wt. % or at least 80 wt. %, based on the total weight of the mixture (M).

PPS Particles

The process of the invention makes possible the preparation of PPS particles of regular shape and size.

As used herein, the term "particle" refers to an individualized entity.

Particles may have an average diameter of less than about 200 μm, in some embodiments from about 0.5 μm to about 150 μm, alternatively from about 1 μm to about 100 μm, or from about 1 μm to about 50 μm. The average diameter can be evaluated by scanning electron microscopy (SEM).

The particles of the present invention can be characterized by their particle size distribution D50 (in short "D50"), which is also known as the median diameter or the medium value of the particle size distribution, according to which 50% of the particles in the sample are larger and 50% of the particles in the sample are smaller. Particle Size Analysis can for example take place in a Microtrac™ S3500 with Microtrac Sample Delivery Controller (SDC).

According to an embodiment of the present invention, the PPS particles have a D50 comprised between 5 μm and 100 μm, for example less than 80 μm and greater than 10 μm or less than 60 μm and greater than 15 μm.

The particles of the present invention can be characterized by their bulk density and by their tapped density. The bulk density of a powder is the ratio of the mass of an untapped powder sample and its volume including the contribution of the interparticulate void volume. The bulk density can be expressed in grams per millilitre (g/ml) or in grams per cubic centimetre (g/cm³). Density measurements can for example take place in a Quantachrome Autotap™ Tapped Density analyser.

According to an embodiment of the present invention, the PPS particles have:
  a bulk density of at least 0.45, preferably at least 0.47, more preferably at least at least 0.49, and
  a tapped density of at least 0.55, preferably at least 0.57, more preferably at least at least 0.59.

The present invention also relates to particles of polyphenylene sulfide polymer (PPS) produced by a process comprising:
  melt-blending the PPS with at least one polyester polymer (PE) comprising units from:
    at least one dicarboxylic acid component,
    at least one diol component, wherein at least 2 mol. % of the diol component is a poly(alkylene glycol) having a formula (I):

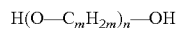

$$H(O-C_mH_{2m})_n-OH$$

wherein m is an integer from 2 to 4 and n varies from 2 to 10, and
  dispersing the PE into water.

All of the above-mentioned embodiments regarding the process for preparing particles of polyphenylene sulfide polymer (PPS) do apply equally to this section of the specification.

The particles of PPS obtained from the process above-described can also be submitted to at least one of the following possible steps:
  coating a powder flow enhancer such as a with a mineral, for example silica;
  drying to a temperature of at least 80° C., for example at least 90° C., for at least 0.5 hour, preferably at least an hour, at possibly reduced pressure; and
  sieving.

The particles of the present invention may be substantially spherical, for example with a circularity and/or a roundness of at least 0.75, for example at least 0.8 or at least 0.85.

The roundness is defined as a measure of surface smoothness of the particles and is measured according to the following equation:

$$\text{Roundness} = 4 \times \frac{\text{Area}}{\pi (\text{Major Axis})^2}$$

The circularity is defined as the measure of spherical shape of the particles and is measured according to the following equation:

$$\text{Circularity} = 4\pi \times \frac{\text{Area}}{\text{Perimeter}^2}$$

The present invention also relates to blends of particles of polyphenylene sulfide polymer (PPS) of the present invention and to process for preparing such blends.

According to an embodiment, the blend of PPS particles of the present invention comprises at least two populations of particles having a D50 ranging from 5 to 100 μm, preferably between 8 and 90 μm, even more preferably between 10 and 70 μm.

Optional Components

The particles of the invention can comprise various additives, such as lubricants, heat stabilizers, light stabilizers, antioxidants, pigments, processing aids, dyes or fillers (e.g. biocompatible fillers such as hydroxyapatite). Mention may in particular be made, by way of examples, of titanium dioxide, zinc oxide, cerium oxide, silica or zinc sulphide, these being used as lubricants and/or abrasive. Fillers (e.g. reinforcing fillers or mineral fillers) can be selected from the group consisting of glass fibers, carbon fibers, talc, wollastonite, calcium carbonate, mica . . . etc.

The polymer composition may further comprise flame retardants such as halogen and halogen free flame retardants.

One of the main advantages of the present invention is that the optional additives, when present, are located inside the PPS particles, and are homogeneously located in the polymer matter.

Applications

The particles of the present invention can be used in various applications, notably SLS 3D printing, coatings and toughening of thermoset resins.

The present invention also therefore relates to the use of the PPS particles for the manufacture of three-dimensional objects using a laser-sintering additive manufacturing system.

EXAMPLES

Example 1

Raw Materials
PPS: Ryton® QC160N commercially available from Solvay Specialty Polymers USA, L.L.C.
PE: Sulfopolyester Eastman AQ™ 48 commercially available from Eastman. This PE is composed of diethylene glycol, cyclohexanedimethanol (CHDM), isophthalates and sulfoisophthalates units. According to 1H NMR analysis, the molar concentration of diethylene glycol of 70 mol. %, based on the total moles of diols (CHMD+diethylene glycol).
PTS: Para toluene sulfonate from Spectrum Chemical.

Material Processing

Blends were made according to Table 1.

15 g of each composition was melt-blended during 3 minutes in a DSM Xplore® Micro-compounder at a specific temperature (see Table 1) and at 150-200 rpm. Each blend was then processed into strands and then quenched in air until solid. Samples were immersed into water heated to 95° C., for 2 hours. Water was then removed. Samples were immersed again into water heated at 90° C., for 2 hours.

Some compositions (Ex 1, Ex 2 and Ex 3) gave a polymer powder according to the invention. The powders were then isolated by filtration and vacuum dried.

TABLE 1

|  | PPS (wt. %) | PE (wt. %) | PTS (wt. %) | T (° C.) melt-blend | Form |
| --- | --- | --- | --- | --- | --- |
| Ex 1 | 50 | 50 | — | 330 | powder |
| Ex 2 | 40 | 60 | — | 280 | powder |
| Ex 3 | 30 | 70 | — | 280 | powder |
| Ex 4 C | 50 | — | 50 | 329 | Porous solid |

Scanning Electron Microscopy (SEM)

Scanning electron microscopy was used to examine each polymer sample as indicated below. Powders were dispersed onto carbon-tape affixed to aluminum stub, and then sputter-coated with AuPd using an Emitech K575x Turbo Sputter Coater. Images were recorded using a Hitachi S-4300 Cold Field Emission Scanning Electron Microscope and images were analysed for average diameter using ImageJ v 1.49b Java-Based Image Analysis Software on approximated 50 particle images. A summary of average particle diameter estimated from SEM pictures for the powders appear in Table 2.

FIG. 1 is an SEM scan of the PPS particles of Example 1.

Particle Size Analysis—D50

Particle size analysis (PSA) was conducted using a Microtrac S3500 with Microtrac Sample Delivery Controller (SDC).

TABLE 2

|  | Average diameter (μm) | D50 (μm) |
| --- | --- | --- |
| Ex 1* | 8.2 ± 3.5 | 29.2 |
| Ex 2 | 6.3 ± 3.7 | 21.8 |
| Ex 3 | 2.8 ± 1.4 | 19.6 |

*The particles of example 1, shown on FIG. 1, have a circularity of 0.911 ± 0.035 and a roundness of 0.929 ± 0.065.

Example 2

This example aims at demonstrating that the modified PET component described in JP2014043522 does not dissolve in water heated to a temperature of 95° C.

Raw Materials
PET: Estar® Polyester EN052, commercially available from Eastman Chemical
DMSI: Dimethyl 5-sulfoisophthalate sodium salt (purity 98%, Mw: 296.23), commercially available from Alfa Aesar Process of Preparation of the Modified PET 13 g of PET (90 mol. %) and 2.3 g of DMSI (10 mol. %) were melt-blended in a DSM micro-compounder at 310° C. during 4 to 8 minutes.

Water-Solubility Test

All samples were exposed to a water bath heated to 80° C. for 1 hour at the following condition: 0.5 g of material and 10 g of deionised water.

TABLE 3

|   | PET (mol. %) | DMSI (mol. %) | Time of melt-blending (min) | Water solubility test |
|---|---|---|---|---|
| A | 90 | 10 | 4 | The modified PET did not dissolve |
| B | 90 | 10 | 6 | The modified PET did not dissolve |
| C | 90 | 10 | 8 | The modified PET did not dissolve |

Example 3

Raw Materials

PPS: Ryton® QC160N commercially available from Solvay Specialty Polymers USA, L.L.C.

PE: Sulfopolyester Eastman AQ™ 38 S commercially available from Eastman. This PE is composed of diethylene glycol, cyclohexanedimethanol (CHDM), isophthalates and sulfoisophthalates units. According to 1H NMR analysis, the molar concentration of diethylene glycol of 80 mol. %, based on the total moles of diols (CHMD+diethylene glycol).

Material Processing

Blends were made according to Table 4.

Each composition was melt-blended in a ZSK-26 Twin Screw Extruder (Coperion) at specific conditions indicated in Table 4.

Each polymer melt was dropped from the extruder die in a bucket of hot water (60° C.) with occasional mixing. Powders were isolated by vacuum filtration employing a Buchner funnel. Powders were then washed with 2-3 L of deionized water in the Buchner funnel. Powders were dried at 100° C. and reduced pressure. Each polymer was mixed with colloidal silica (Aerosil® 200, Spectrum Chemical) to give a 1 wt. % mixture.

TABLE 4

|  | PPS (wt. %) | PE (wt. %) | Screw speed (rpm) | Melt Temp (° C.) | Throughput (lb/hr) |
|---|---|---|---|---|---|
| Ex 5 | 50 | 50 | 100 | 300 | 35 |
| Ex 6 | 50 | 50 | 100 | 340 | 35 |

Particle Size Analysis—D50

Particle size analysis (PSA) was conducted using a Microtrac S3500 with Microtrac Sample Delivery Controller (SDC).

Bulk and Tapped Densities

Density was conducted using a Quantachrome Autotap™ Tapped Density analyser, employing a cycle of 500 taps.

TABLE 5

|  | $D_{10}$ (μm) | $D_{50}$ (μm) | $D_{90}$ (μm) | Bulk density | Tapped density |
|---|---|---|---|---|---|
| Ex 5 | 4 | 6 | 10 | 0.505 | 0.664 |
| Ex 6 | 6 | 41 | 175 | 0.499 | 0.606 |

The invention claimed is:

1. Particles of polyphenylene sulfide polymer (PPS) obtained by the process comprising the steps of:
    melt-blending a mixture (M) comprising:
        a) at least one PPS, and
        b) at least one water-dispersible polyester polymer (PE) comprising units from:
            at least one aromatic dicarboxylic acid component comprising:
                at least one aromatic dicarboxylic acid selected from the group consisting of isophthalic acid (IPA), terephthalic acid (TPA), naphthalenedicarboxylic acid, 4,4'-bibenzoic acid, 2,5-pyridinedicarboxylic acid, 2,4-pyridinedicarboxylic acid, 3,5-pyridinedicarboxylic acid, 2,2-bis(4-carboxyphenyl) propane, bis(4-carboxyphenyl) methane, 2,2-bis(4-carboxyphenyl) hexafluoropropane, 2,2-bis(4-carboxyphenyl) ketone, 4,4-bis(4-carboxyphenyl) sulfone, 2,2-bis(3-carboxyphenyl) propane, bis(3-carboxyphenyl) methane, 2,2-bis(3-carboxyphenyl) hexafluoropropane, 2,2-bis(3-carboxyphenyl) ketone, bis(3-carboxyphenoxy) benzene, and mixtures thereof, and
                an aromatic dicarboxylic acid containing at least one $SO_3M$ group attached to an aromatic nucleus, wherein M is H or a metal ion selected from the group consisting of sodium, lithium and potassium,
            at least one diol component wherein the at least one diol is selected from the group consisting of ethylene glycol, diethylene glycol, 1,4-cyclohexanedimethanol, propane-1,2-diol, 2,2-dimethyl-1,3-propanediol and mixtures thereof, and at least 50 mol. % of the diol component, this proportion being based on the total number of moles of the diol component, is the diethylene glycol, and
    processing the mixture (M) into pellets or strands,
    cooling the pellets or strands at a temperature below 80° C.,
    contacting said pellets or strands with water, optionally heated to a temperature up to 95° C. to provide particles,
    recovering the particles,
    optionally drying the particles, and
    optionally sieving the particles;
    wherein the step of melt-blending takes place at a temperature above 250° C. and the particles of PPS have a D50 comprised between 5 μm and 100 μm, a bulk density of at least 0.45 and a tapped density of at least 0.55.

2. Particles of polyphenylene sulfide polymer (PPS) produced by a process comprising:
    -melt-blending the PPS with at least one polyester polymer (PE) thereby dispersing PPS in a phase of the at least one polyester (PE), wherein the at least one polyester polymer (PE) comprises units from:

at least one dicarboxylic acid component, at least one diol component, wherein at least 2 mol. % of the diol component is a poly (alkylene glycol) having a formula (I):

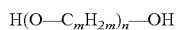

wherein m is an integer from 2 to 4 and n varies from 2 to 10, and dispersing the melt-blended PPS and PE into water to dissolve the PE and recover the particles of PPS, wherein the particles of PPS have a D50 comprised between 5 μm and 100 μm, a bulk density of at least 0.45 and a tapped density of at least 0.55.

3. The particles of claim 1, wherein the particles have a circularity and/or a roundness of at least 0.75.

4. A method comprising: manufacturing three-dimensional objects using a laser-sintering based additive manufacturing system from the PPS particles of claim 1.

5. A method comprising: toughening thermoset resins with the PPS particles of claim 1.

* * * * *